(12) United States Patent
Touchette (10) Patent No.: US 7,891,236 B2
(45) Date of Patent: Feb. 22, 2011

(54) NON OBSTRUCTIVE PRESSURE DIFFERENTIAL VALVE

(76) Inventor: Richard Lucian Touchette, 243 Collingswood Rd., Mooresville, NC (US) 28117

( * ) Notice: Subject to any disclaimer, the term of this patent is extended or adjusted under 35 U.S.C. 154(b) by 186 days.

(21) Appl. No.: 12/191,739

(22) Filed: Aug. 14, 2008

(65) Prior Publication Data

US 2010/0037685 A1 Feb. 18, 2010

(51) Int. Cl.
*G01M 15/02* (2006.01)
(52) U.S. Cl. .................................. 73/114.33; 73/114.76
(58) Field of Classification Search .............. 73/114.33, 73/114.73
See application file for complete search history.

(56) References Cited

U.S. PATENT DOCUMENTS

| | | | | |
|---|---|---|---|---|
| 2,003,949 | A | * | 6/1935 | Morgan et al. ................ 138/46 |
| 3,973,429 | A | * | 8/1976 | Durgan et al. ................ 73/49.7 |
| 4,196,701 | A | | 4/1980 | Tamura et al. |
| 4,213,328 | A | * | 7/1980 | Roeschlaub et al. .......... 73/49.7 |
| 4,430,891 | A | * | 2/1984 | Holm et al. .................... 73/149 |
| 4,448,065 | A | * | 5/1984 | Meurer ..................... 73/114.77 |
| 4,617,824 | A | * | 10/1986 | Cybulski et al. .............. 73/49.7 |
| 4,996,875 | A | * | 3/1991 | Baer et al. ................ 73/118.02 |
| 5,054,314 | A | * | 10/1991 | Cofflard et al. ........... 73/116.02 |
| 5,072,613 | A | | 12/1991 | Baer et al. |
| 5,272,911 | A | * | 12/1993 | Beggs et al. ................. 73/49.7 |
| 5,377,538 | A | | 1/1995 | Cardinal |
| 5,537,870 | A | | 7/1996 | Zurek et al. |
| 5,585,549 | A | * | 12/1996 | Brevick et al. .............. 73/49.7 |
| 6,359,682 | B1 | | 3/2002 | Park |
| 6,363,779 | B1 | | 4/2002 | Hochenberger et al. |
| 6,474,154 | B2 | | 11/2002 | Kohmura et al. |
| 6,675,110 | B2 | * | 1/2004 | Engelmann .................. 702/45 |
| 6,920,863 | B1 | | 7/2005 | Aono et al. |
| 6,955,081 | B2 | | 10/2005 | Schwulst |
| 6,959,591 | B2 | * | 11/2005 | Meyer et al. ............. 73/116.02 |
| 7,017,401 | B2 | * | 3/2006 | Ishii et al. ................ 73/114.77 |
| 7,079,937 | B2 | | 7/2006 | Tanaka |
| 7,085,643 | B2 | | 8/2006 | Muto et al. |

(Continued)

FOREIGN PATENT DOCUMENTS

DE 10063045 10/2003

(Continued)

OTHER PUBLICATIONS

Answers.Com, Air Flow Bench, http://www.answers.com/topic/air-flow-bench, visited Nov. 10, 2010, 9 pages.

(Continued)

*Primary Examiner*—Freddie Kirkland, III
(74) *Attorney, Agent, or Firm*—Moore & Van Alle PLLC; Matthew W. Witsil (57) ABSTRACT

A pressure differential valve apparatus that includes a valve, the valve having a valve head and a valve stem connected perpendicular to the valve head, the valve head having a valve face with an opening that continues inside an interior of the valve head to an intersection with the valve stem and along a length of the valve stem to a top of the valve stem, wherein the apparatus allows unobstructed pressure readings when the valve face is rotated in a radial direction within an area of flow of a cylinder head.

20 Claims, 11 Drawing Sheets

U.S. PATENT DOCUMENTS

| | | |
|---|---|---|
| 7,152,465 B2 * | 12/2006 | Candeo .................. 73/116.04 |
| 7,527,027 B2 * | 5/2009 | Fuwa et al. .............. 123/90.11 |
| 2004/0035195 A1 | 2/2004 | Igarashi et al. |
| 2005/0039526 A1 | 2/2005 | Schwulst |
| 2005/0235940 A1 | 10/2005 | Shimatsu |
| 2006/0048565 A1 | 3/2006 | Rutschmann et al. |
| 2006/0173607 A1 | 8/2006 | Matsuo |
| 2007/0101807 A1 | 5/2007 | Shimatsu |
| 2007/0256478 A1 * | 11/2007 | Guadagnola et al. ........... 73/40 |

FOREIGN PATENT DOCUMENTS

JP   58135966   8/1983

OTHER PUBLICATIONS

Jetzilla Magazine, http://jetzilla.com/Vol01Num03/jetZilla.html, visited Nov. 10, 2010, 25 pages, vol. 1, No. 3.

CT Platon, Torbar Averaging Pitot Tube, http://www.ctplaton.com/uploads/pdf/En/deb_tor.pdf, visited Nov. 10, 2010, 2 pages.

* cited by examiner

NON OBSTRUCTIVE PRESSURE DIFFERENTIAL VALVE

BACKGROUND OF THE INVENTION

The present invention is related to valves used for cylinder head testing, and more specifically to a non obstructive pressure differential valve.

Currently, engines are being designed and tested to produce more and more power. As a part of this design and testing, cylinder heads of the engine are tested to determine pressure differentials within an area of flow of the intake and/or exhaust ports. Current testing of cylinder heads includes placing a pitot tube in the mainstream flow path of a cylinder head while on flow test equipment at a standard test pressure that produces pressure differentials during velocity mapping. However, this is problematic in that the pitot tube placed in the mainstream flow path produces flow obstructions in the flow path of the air as it passes through the cylinder head and out of the intake or exhaust port with the valve.

BRIEF SUMMARY OF THE INVENTION

According to another aspect of the present invention, a pressure differential valve apparatus includes a valve, the valve having a valve head and a valve stem connected perpendicular to the valve head, the valve head having a valve face with an opening that continues inside an interior of the valve head to an intersection with the valve stem and along a length of the valve stem to a top of the valve stem, wherein the apparatus allows unobstructed pressure readings when the valve is rotated in a radial direction within an area of flow of a cylinder head.

According to another aspect of the present invention, a method for generating a radial pressure differential mapping for a cylinder head port includes positioning a valve head of a valve in a cylinder head port, the valve head having a valve face with an opening, reading a pressure value at the opening located in an initial radial direction, rotating the valve such that the opening is in a different radial direction, reading a second pressure value at the opening in the different radial direction, repeating the rotating and reading multiple pressure values at the opening in different radial directions until the opening is rotated back to the initial radial direction to get a set of radial pressure values, and mapping the set of radial pressure values according to their associated radial direction.

According to a further aspect of the present invention, a non-obstructing pressure differential valve test apparatus includes a valve, the valve having a valve head and a valve stem connected perpendicular to the valve head, the valve head having a valve face with an opening that continues inside an interior of the valve head to an intersection with the valve stem and along a length of the valve stem to a top of the valve stem; and a stop collar, the stop collar having an opening through the center along a length of the stop collar for passage of the valve stem, the stop collar connected to the valve and configured to rotate the valve face; and a workstation, the workstation being configured to: receive a valve diameter and a lift value, calculate a valve area, provide an option for entering at least one of a machine baseline percentage or a machine correction factor, provide an option for entering at least one of a port flow pressure, a port flow percentage or a port flow range, calculate a corrected cubic feet per minute (CCFM) based on at least one of the port flow percentage, the port flow range or the machine correction factor, calculate a cubic feet per minute (CFM) for each pressure value in the set of radial pressure values based on the set of radial pressure values, the port flow pressure and the CCFM, calculate a velocity for each pressure value based on the CFM for each pressure value and the valve area, and generate a color graphic displaying the calculated velocities, each velocity being displayed with an associated valve face direction and an associated color based on a value of each velocity for each pressure value relative to values of other velocities for each pressure value, wherein the apparatus allows unobstructed pressure readings in a radial direction within an area of flow of a cylinder head.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention relate to a non obstructing pressure differential valve test apparatus that provides cylinder head testing to measure pressure differentials in the valve flow area without obstructing the flow path of air during testing. The specifications for the pressure differential valve test apparatus may be based on the specific cylinder head design being tested or research preferences. For example, specifications such as the test valve outside diameter, under head radius, stem size, valve stem length, etc. may be based on the cylinder head type or valve guide length.

According to embodiments of the present invention, a non obstructing pressure differential valve test apparatus may include a valve that has a valve head and valve stem where the valve head has a valve face with an opening. The opening continues thru the interior of the valve head to an intersection with the valve stem and along the length of the interior of the valve stem to the top of the valve stem. The apparatus may also include a collar that has an opening through the center along a length of the collar for passage of the valve stem. The collar may be connected to the valve and configured to permit the rotation of the valve. The valve face may be inserted into a cylinder head valve flow area and be rotated in a radial direction to obtain various pressure readings in the valve area of flow of the cylinder head port. These differential pressure readings may then be mapped and compared with each other. Further, the cylinder head design may be modified and retested and the test values compared with previous tests to determine a desired or optimal cylinder head design.

The amount of valve lift or off seat dimension may be determined by a stop collar and set screw combined with a set of height standards so a test operator can choose and setup any lift dimension desired. The opening at the valve face seat continued through the interior of the valve stem may proceed to the opening in the top of the valve for connection to a pressure gauge for taking pressure readings.

The radial position of the valve face may be rotated in a number of equally designated positions or directions due to equally spaced splines along the length of the valve stem of the test valve. To illustrate embodiments of the present invention, the valve face will be discussed as being rotated in eight equally designated positions/directions, however, embodiments of the present invention are not limited by this number as any embodiment with more or less positions/directions is still within the scope of the present invention. A position collar clamped to the cylinder head to be tested serves as the stand for the valve lift standards/height gauges as well as the body for a ball pin detent, part of a set screw, responsible for positioning and setting the valve's radial positions.

The height stop collar may be clamped to the valve stem of the test valve with set screws, set up with a specific height standard (e.g. 1 inch) and the valve face in a position seated against its seat on the cylinder head. A marked line on the height stop may be inline with the spline which is aligned to the valve face opening so the test operator can identify the position of the valve face opening during testing. The test operator may use different standard height gauges to achieve different desired valve off seat heights (i.e., valve lift values) to be tested, and rotate the valve to the equally radial numbered positions.

Figure 1:
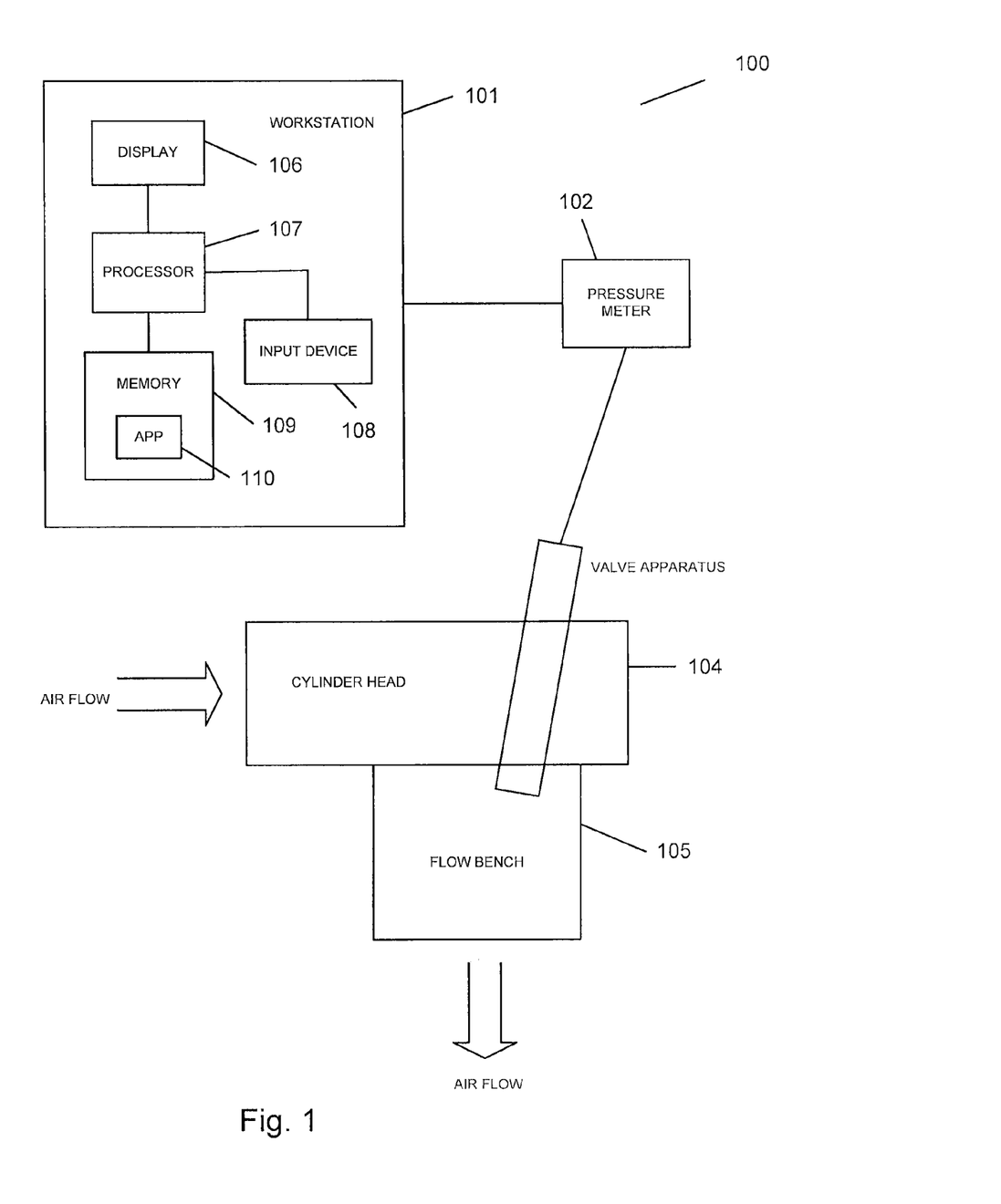
FIG. 1 is a block diagram of a non obstructing pressure differential valve test system according to an exemplary embodiment of the present invention.

FIG. 1 shows a block diagram of a non obstructing pressure differential valve test system according to an exemplary embodiment of the present invention. The system 100 may include a workstation 101, a pressure meter 102, a valve apparatus 103, a cylinder head 104, and a flow bench 105. The workstation 101 may include a display 106, a processor 107, an input device 108, a memory 109, and an application 110 stored in the memory 109. The valve apparatus 103 may be inserted through an intake or exhaust port of a cylinder head and partially into the flow bench 105. The valve apparatus 103 may include at least one collar, and a valve (these details not shown here but shown later), which includes a valve stem and valve face with an opening. The valve face with the opening may be placed in an area of flow of a port of the cylinder head 104 and rotated in a radial direction to obtain multiple pressure readings from 360 degrees that may be read by the pressure meter 102 and stored by the workstation 101. The air pressures obtained at the opening in the valve face are transferred through the opening in the valve face along the valve stem to the top of the valve apparatus 103 for reading by the pressure meter 102. The processor 107 may execute the application 110 to map the obtained pressure values to any of many different types of graphical displays such as, for example, a circular chart, a bar chart, a pie chart, etc. allowing a test operator to view and analyze problem areas.

Figure 2:
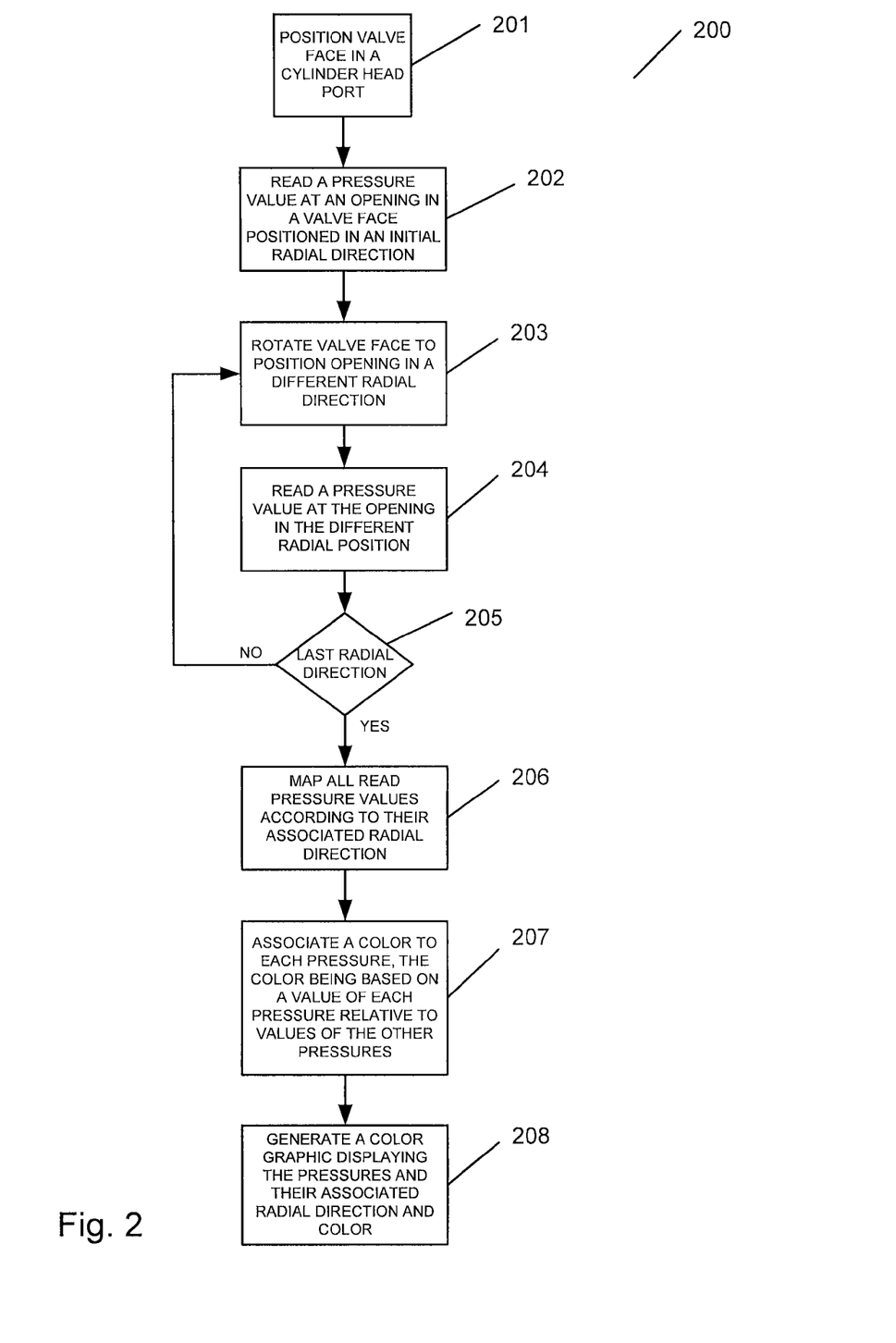
FIG. 2 is a flowchart of a process for non obstructing pressure differential valve testing according to an exemplary embodiment of the present invention.

FIG. 2 shows a flowchart of a process for non obstructing pressure differential valve testing according to an exemplary embodiment of the present invention. In the process 200, in block 201, a valve face may be positioned in a cylinder head port. In block 202, a pressure value may be read at an opening in the valve face positioned in an initial radial direction. In block 203, the valve face may be rotated to position the opening in a different radial direction. In block 204, a pressure value may be read at the opening in the different radial direction. In block 205, it may be determined if this is the last radial direction and if not the operations in blocks 203 and 204 are repeated to obtain pressure readings for different radial directions. If this is the last radial direction, then in block 206 all read pressure values may be mapped according to their associated radial directions. In block 207, a visual identifier (e.g., color, gray scale), etc. may be associated to each pressure where the identifier may be based on a value of each pressure relative to values of the other pressures. In block 208, a graphic displaying the pressures and their associated radial direction in the identifier such as color may be generated and displayed.

Figure 3:
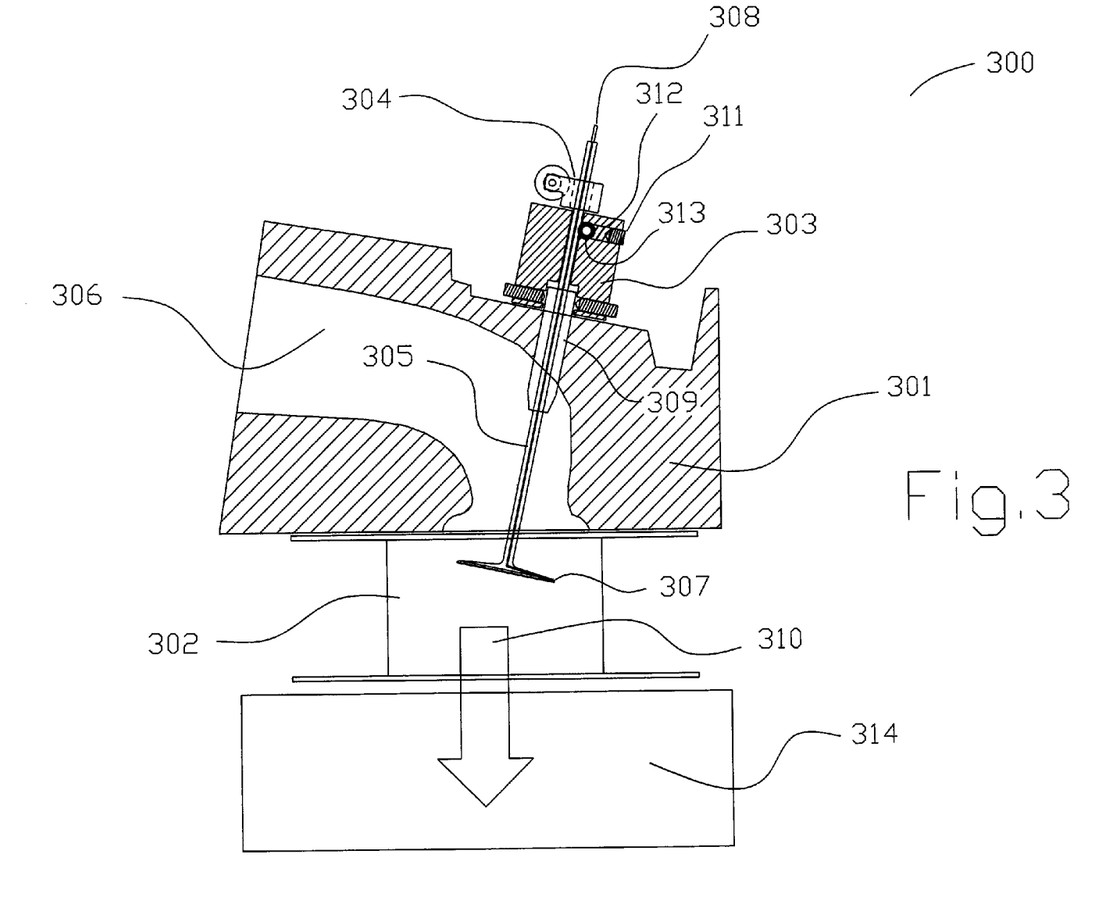
FIG. 3 is a diagram of a pressure differential valve apparatus according to another exemplary embodiment of the present invention.

FIG. 3 shows a diagram of a pressure differential valve apparatus according to another exemplary embodiment of the present invention. The apparatus 300 may include a cylinder head 301, fixture 302, a valve positioning collar 303, a valve stop collar 304, a test valve 305, a cylinder head valve guide 309 and a flow bench 314. The cylinder head 301 may include an inlet port 306 where air flows into the cylinder head 301. The air flows through the cylinder head 301 and into the fixture 302. The air may also flow out of the fixture and into a flow bench 314. The test valve 305 may include a valve head having a valve face with an opening 307. The valve may be inserted into a port of the cylinder head 301 at a desired valve height between the cylinder head 301 and the fixture 302. The valve positioning collar 303 may attach to the cylinder head 301 via the valve guide 309 and position the test valve 305 through the cylinder head 301. The stop collar 304 may attach to the test valve 305 and may be moved up or down to adjust the valve lift of the valve face of the test valve 305.

A height gauge (shown later) may rest on the valve positioning collar 303 between the valve positioning collar 303 and the stop collar 304 before the stop collar 304 is attached to the test valve 305. The height gauge may be of a certain dimension that insures that the exact desired valve lift is obtained when the height gauge is removed and the stop collar 304 is moved towards the valve positioning collar 303 to rest on the valve positioning collar 303. Set screws may be used to attach the valve positioning collar 303 to the valve guide 309. Other methods may also be used for attachment of the positioning collar 303.

The opening 307 in the valve face of the test valve 305 may continue through the inside and interior of the test valve 305 to the top of the test valve. The top of the test valve may have a tap, connector, or other type connection 308 allowing connection of a pressure gauge to the test valve 305 for measuring pressures read at the opening 307 in the valve face of the test valve 305. The stop collar 304 may be used to rotate the valve face opening 307 of the test valve 305 in a radial direction allowing the obtaining of pressure readings in different radial directions in a flow area of the cylinder head 301. The air flow 310 may be drawn into the cylinder head 301 and flow through the port. A set screw 311 may include a detent spring 312 that applies pressure to a detent ball 313. The detent ball 313 may fit securely into a spline (not shown) of many splines that reside on the outside of the test valve 305 allowing the positioning and rotation of the test valve 305 by the positioning collar 303.

Figures 4A, 4B:
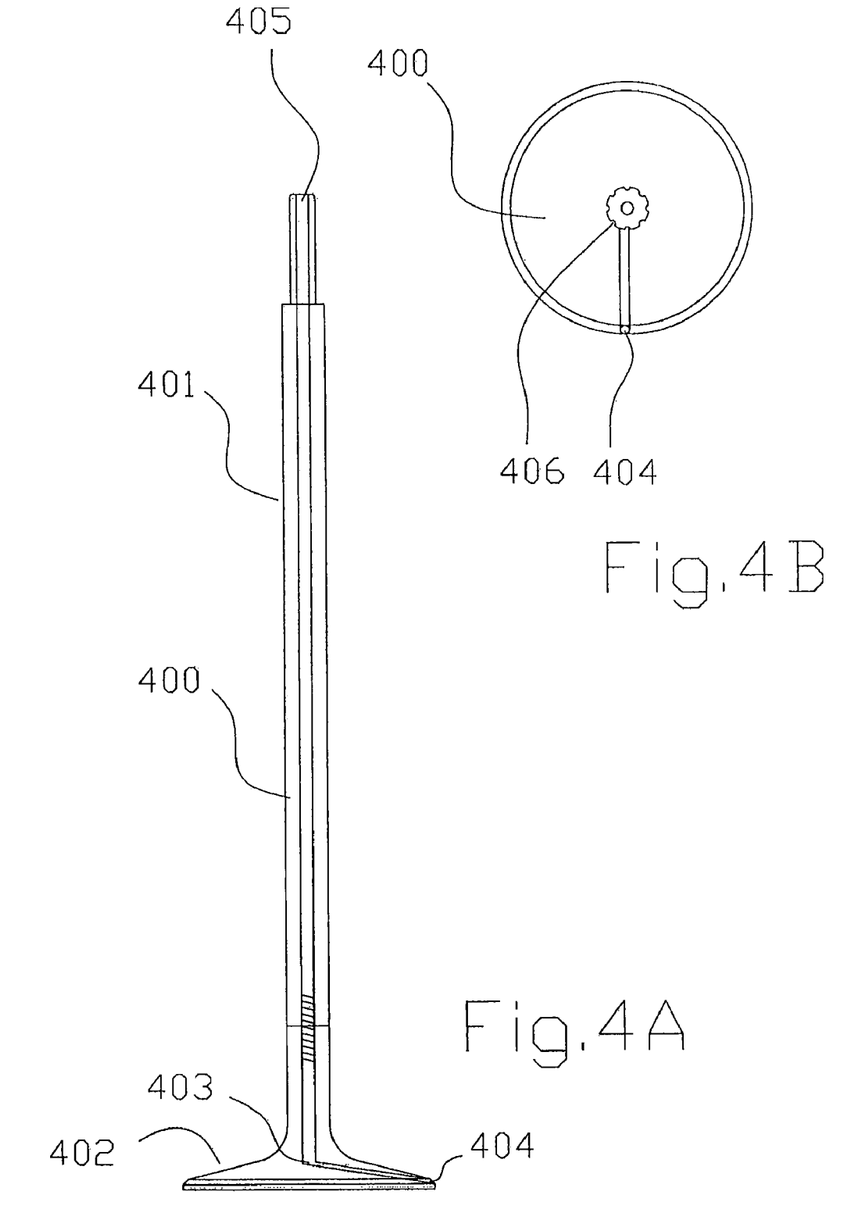
FIGS. 4A and 4B are different views of a non obstructing test valve according to an exemplary embodiment of the present invention.

FIGS. 4A and 4B show different views of a non obstructing test valve according to an exemplary embodiment of the present invention. FIG. 4A shows a test valve 400 that may include a valve stem 401 and valve head 402 at one end of the valve stem 401 that has a valve face. The test valve 400 may include an opening 404 in the valve face for taking pressure readings. The opening 404 may continue to an interior of the valve head 402 and then through the interior 403 of the valve stem 401 to the top of the valve stem 401 allowing pressure readings to be taken at an opening 405 at the top of the valve stem 401. FIG. 4B shows a top view of the test valve 400 and shows the splines 406 that reside around a perimeter of the valve stem 401 for allowing location and rotation of the test valve 400. The opening 404 in the valve face is also shown. The test valve 400 when placed in an area of flow allows unobstructed pressure readings to be obtained.

Figure 5:
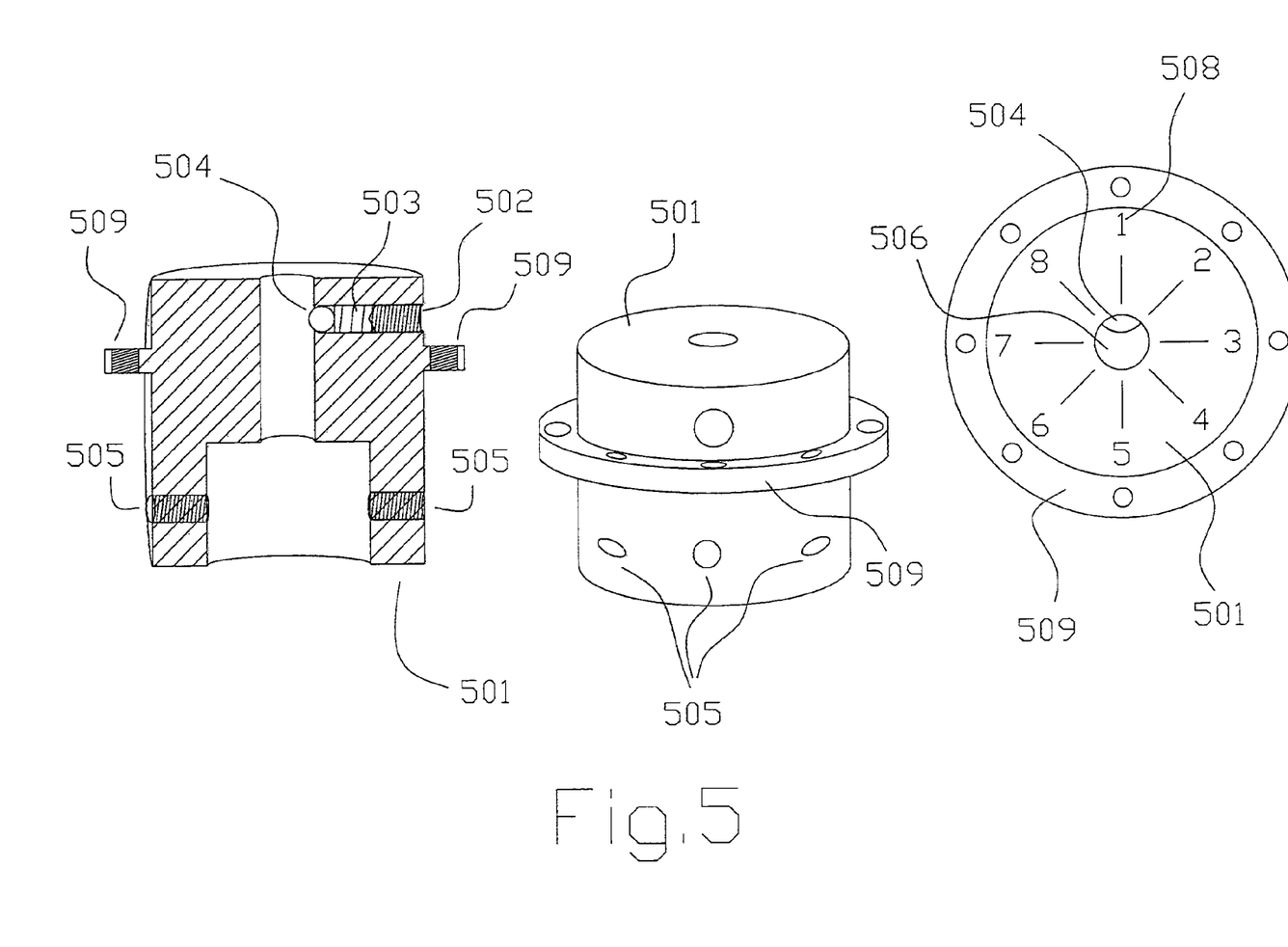
FIG. 5 is various views of a positioning collar according to an exemplary embodiment of the present invention.

FIG. 5 shows various views of a positioning collar according to an exemplary embodiment of the present invention. The positioning collar 501 is shown initially with a cut-out view to illustrate the interior of the positioning collar 501. This illustrates where the test valve and the cylinder head valve guide pass through. The positioning collar 501 may include one or more set screws 505 for attaching to the cylinder head valve guide. Further, a set screw 502 may include a spring 503 that exerts pressure on a ball pin detent 504 for insertion into a spline on the outside of the valve stem. This allows position and rotation of the test valve. The top of the positioning collar 501 shows the inner diameter 506 allowing passage of the valve stem. This inner diameter 506 may be sized to the specification of the valve stem. As shown, the detent ball 504 protrudes slightly into the opening for intersection with the spline on the side of the valve stem.

The top of the positioning collar 501 may also include markings (e.g., numerical markings) 508 denoting the various radial positions that the test valve may be rotated to obtain the multiple pressure readings from various radial positions of the opening in the valve face of the test valve. In this exemplary embodiment, eight positions are shown, however, embodiments of the present invention are not limited to this number of radial positions. The valve stem may have eight splines (or other methods) along its sides for insertion of the ball pin detent 504 for rotation of the valve face opening in the multiple radial positions. In this exemplary embodiment, a ring 509 is shown and may be attached to the positioning collar 501 on an outside of the positioning collar 501 and extending outward. The ring 509 may also include attachments to clamp the positioning collar 501 to the cylinder head.

Figure 6:
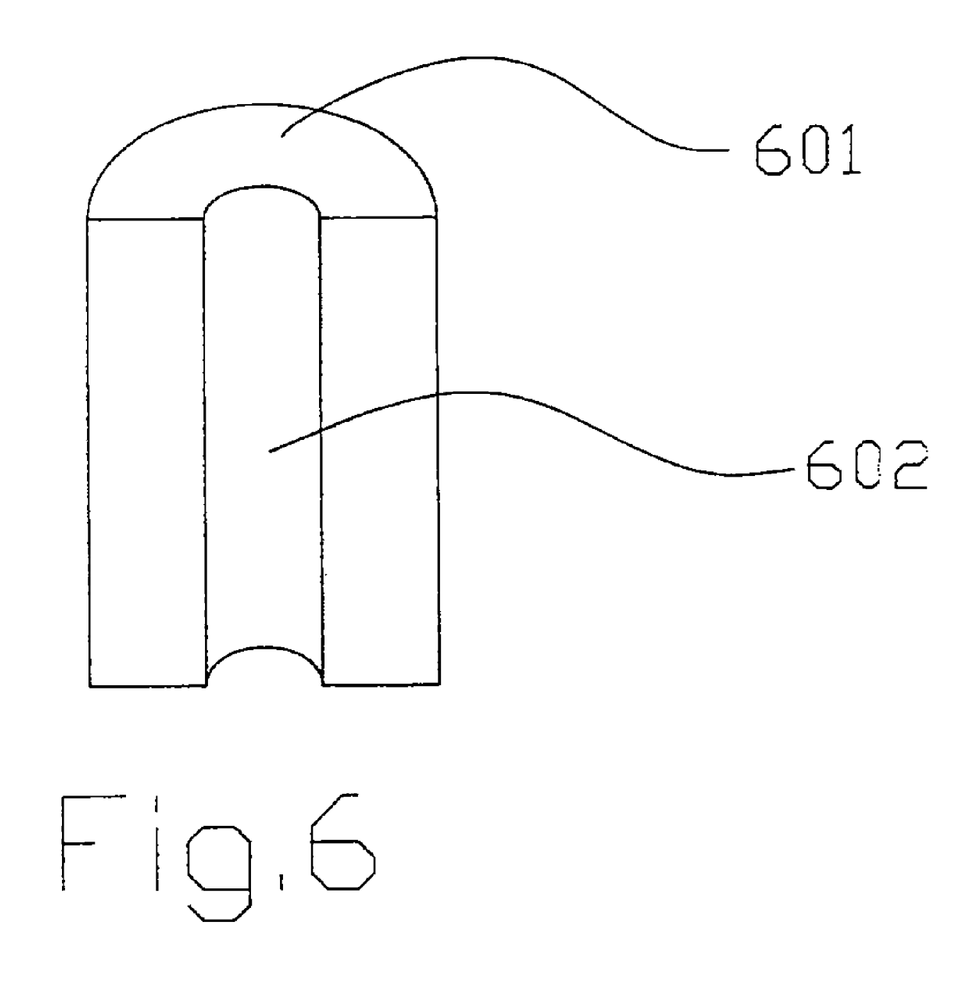
FIG. 6 is a diagram of a height gauge according to an exemplary embodiment of the present invention.

FIG. 6 shows a diagram of a height gauge according to an exemplary embodiment of the present invention. The height gauge 601 may be shaped as a partial cylinder. However, embodiments of the present invention are not limited to this shape. The inside radius (or diameter) 602 of the height gauge 601 may be determined based on specifications of the valve stem. The height gauge 601 may only be a semi-circle or partial of a circle as it is used to sit between the positioning collar and the stop collar to set a valve lift that is desired at a valve face from a port opening in the cylinder head. Various different sizes of height gauges may be used to get different valve lift dimensions depending on the type of testing that is desired. Once the height gauge 601 has been inserted between the positioning collar and the stop collar, and the stop collar has been secured to the test valve, the height gauge may then be removed and may no longer be needed. After removal of the height gauge, the stop collar may be moved towards the positioning collar until it rests on the positioning collar thereby providing the desired value lift for the valve face.

Figure 7:
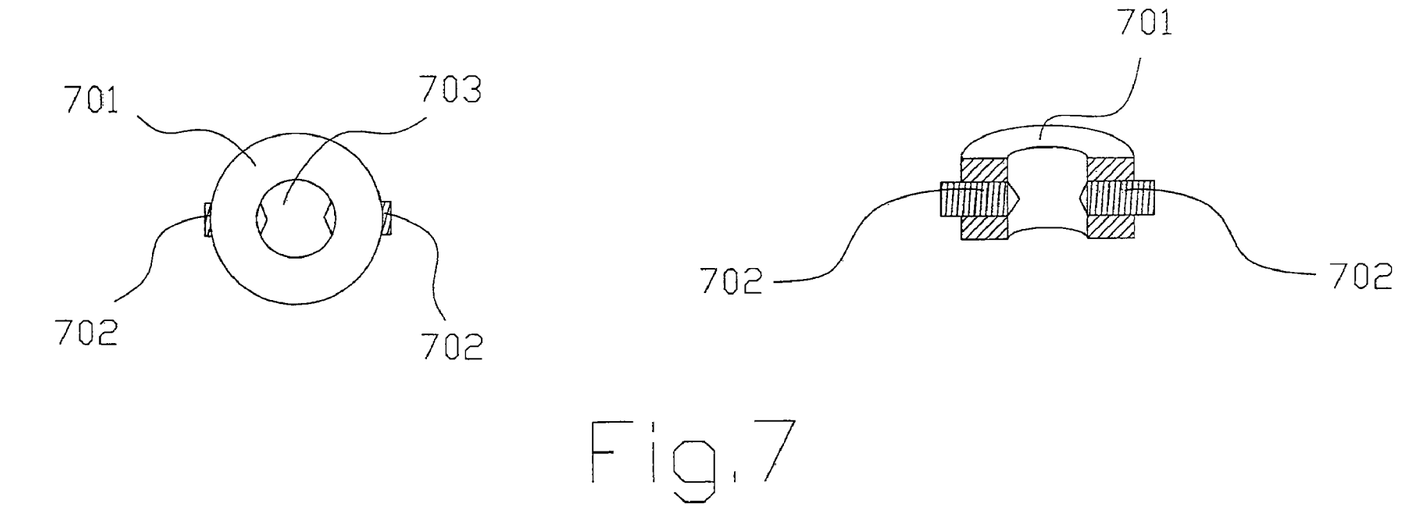
FIG. 7 is different views of a stop collar according to an exemplary embodiment of the present invention.

FIG. 7 shows different views of a stop collar according to an exemplary embodiment of the present invention. A clamping collar 701 may include one or more set screws 702 inserted into the sides of the clamping collar 701 that provide connection to the test valve. The inner diameter 703 of the stop collar 701 may be based on specifications of the diameter of the valve stem. The clamping collar 701 may be attached to a valve to rotate the valve in various radial positions to obtain the multiple pressure readings from an opening in a valve face of the valve when the valve face is inserted into a flow area of a cylinder head.

Figure 8:
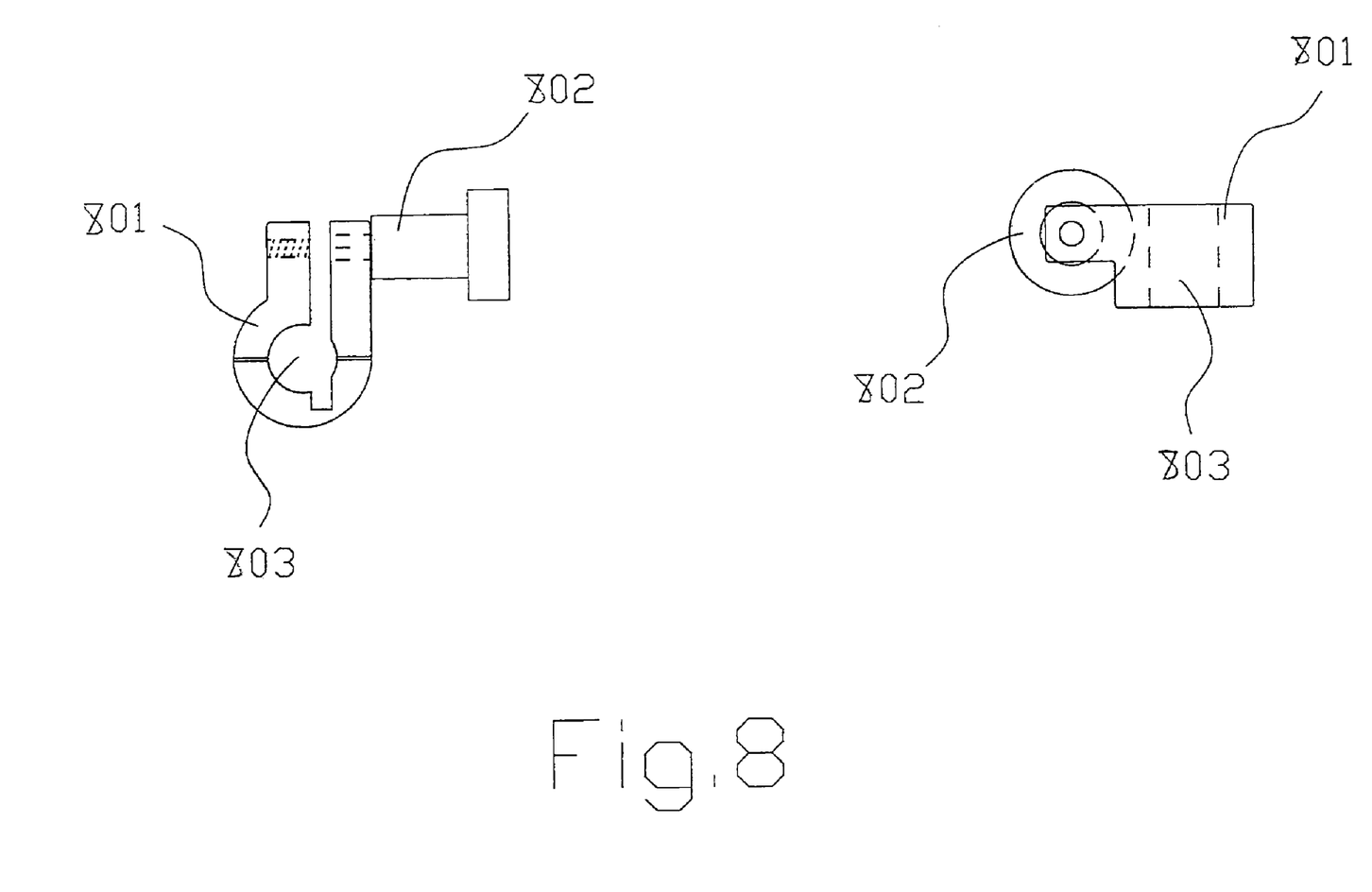
FIG. 8 is a diagram of a stop collar according to another exemplary embodiment of the present invention.

FIG. 8 shows a diagram of a stop collar according to another exemplary embodiment of the present invention. The stop collar 801 may include a clamping knob 802 and an inner diameter 803. The clamping knob 802 may be used for movement and rotation of the stop collar 801 for moving a valve into a flow area of a cylinder head and for rotation of the valve. The inner diameter 803 may be sized to diameter of the valve.

Figure 9:
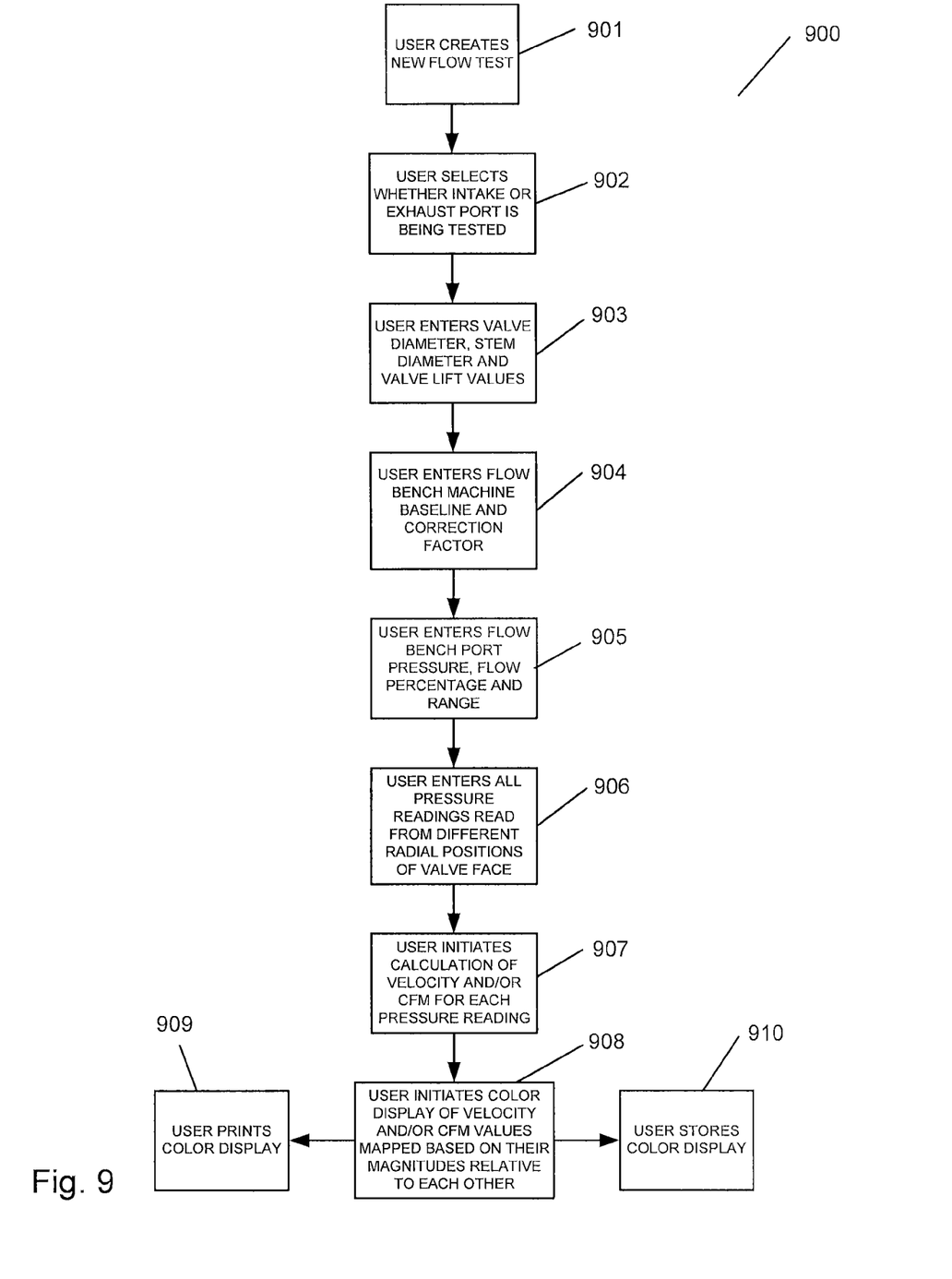
FIG. 9 is a flowchart of a process for mapping pressure values according to an exemplary embodiment of the present invention.

FIG. 9 shows a flowchart of a process for mapping pressure values according to an exemplary embodiment of the present invention. In the process 900, in block 901 a user at a workstation, may initiate a new flow test. In block 902, the user may select whether an intake or exhaust port of a cylinder head is being tested. In block 903, the user may enter a valve diameter, a valve stem diameter, and/or a valve lift value. After entering these values, a flow area value may be displayed. In block 904, the user may enter a flow bench machine baseline and/or a flow bench correction factor. In block 905, the user may enter a flow bench port pressure, a flow percentage, and/or a flow range. In block 906, the user may enter all pressure readings read from different radial positions of the valve face. In block 907, the user may initiate calculation of a velocity and/or cubic feet per minute (CFM) for each pressure reading. In block 908, the user may initiate a color display of the velocity and/or CFM values mapped for each pressure reading based on their magnitudes relative to each other. In block 909, the user may print the color display and/or in block 910, the user may store the color display.

Figure 10:
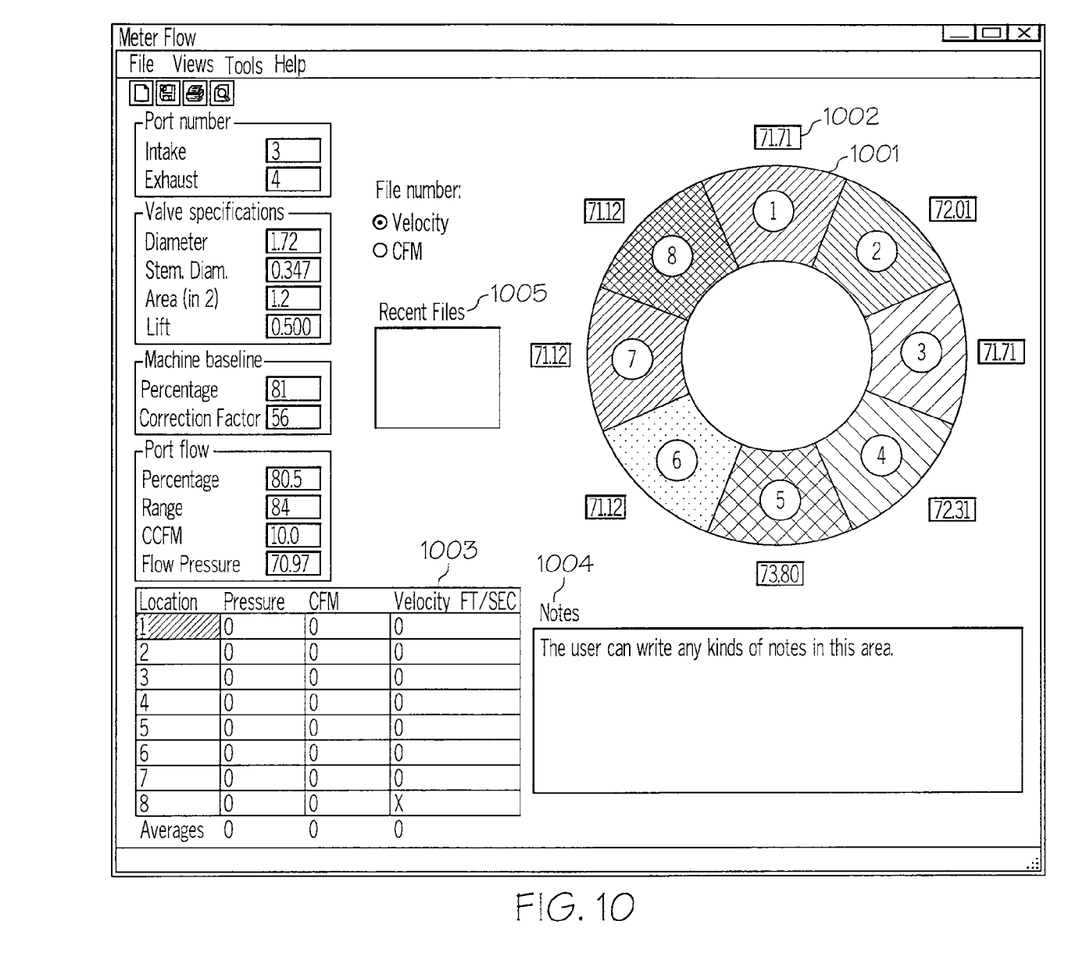
FIG. 10 is a diagram of a flow test GUI according to an exemplary embodiment of the present invention.

FIG. 10 shows a diagram of a flow test GUI according to an exemplary embodiment of the present invention. The graphical user interface (GUI) shown in this figure may be a screen presented on a workstation to a user that is initiating a flow test. The GUI allows the user to input various parameters to be used in calculations regarding the testing. The user may enter whether the test is being performed on an intake port or an exhaust port and may enter the appropriate port number. The user may also enter various valve specifications such as, for example, a valve diameter, a valve stem diameter, a valve lift, etc. Further, the user may enter flow bench machine baseline information such as, for example, a percentage, a correction factor, etc. The machine baseline section allows the user to identify his/her own baseline for weather corrections to their flow bench, and have the option to adjust this manually. The percentage allows a user to input the percentage of flow for his/her own verifying flow bench or test orifice. The correction factor is a value that may be inputted by the user and will be either added (if a whole number) or subtracted (if a negative number). This allows the user to keep the flow test on their flow bench more accurate as it takes into consideration specifics of the flow bench or test orifice. The user may also enter flow bench port flow information such as, for example, a percentage, a range, a corrected cubic feet per minute (CCFM), a flow pressure, etc. The flow pressure box allows a user to enter the flow pressure being used during the testing as well as change the value. The user may change the pressure and see what the flow CCFM may be at a different pressure. The flow pressure box may be set to default to a certain value (e.g. 28 inches of water). The percentage box is the percentage reading that a user may have with the port on that test. The range allows entering of a range of flow orifice that the user is on for the flow bench the user is using. The corrected CFM may be calculated based on one or more values if entered by the user such as, for example, a value entered into the correction factor box.

The table 1003 may be used to enter the various radial pressures that have been read during the testing. Further, the user may enter notes in a notes field 1004 regarding any comments desired to be recorded with this particular test. The user may also select whether a graphical representation of the various pressures are to be based on a velocity or a cubic feet per minute by selecting a radial button or other means on the graphical user interface. In the table 1003, a user may enter a location of a pressure reading from the valve face opening, record the reading in the reading box, then rotate clockwise to the next position and repeat reading and recording in all other positions. After all readings have been entered, the user may hit enter, for example, and the associated CFM and/or velocity values may be calculated and the colors appear on the color wheel. The cubic feet per minute (CFM) and velocity in feet per second are automatically calculated. The following are example equations that may be used for the calculations: valve area=Pi*valve diameter/2*valve lift; CCFM=port flow range*(port flow percentage/100)+machine correction factor); CFM=SQRT (port flow pressure/pressure reading*CCFM)/number of pressure readings (e.g., 8); Velocity=CFM/valve area*2.4, where "SQRT is square root, "*" is multiplication, "/" is division, and "2.4" an example constant factor.

In the table 1003 the averages for each column may be shown at the bottom to allow a user to see if there are any testing errors, or if the flow is very unstable. The GUI may also present a field 1005 that shows a list of recent files related to other tests that have been performed in the past. The user may desire to toggle between various tests for comparison. Although not shown, the GUI may also present areas where a user may enter swirl information and/or tumble information.

After the user has entered the various parameters and retrieved the various radial pressures, the user may initiate the mapping of the pressures for display on the GUI. In this exemplary embodiment, the pressures have been displayed associated with their radial direction 1001. Each radial direction (denoted by the numbers 1-8) has an associated area 1002 that has the numerical value of either the velocity or the CFM. In this exemplary embodiment, the pressures are shown as a color wheel where each color or each radial direction (e.g., 1-8) may have an associated color representative of the magnitude of the velocity or CFM. This provides a visual picture to a user or test operator of the magnitudes associated with the pressure readings at the various radial directions and how they relate to each other. Other graphical presentations of velocity and/or CFM may also be presented using colors, gray shades, or other differentiating methods and still be within the scope of the present invention. For example, the velocities and/or CFM values may also be presented as a bar chart, pie chart, etc. showing the values and their associated relative radial direction from where the pressure readings were taken. Selecting velocity or CFM radial buttons may cause the color wheel to change to the respective calculations.

Figure 11:
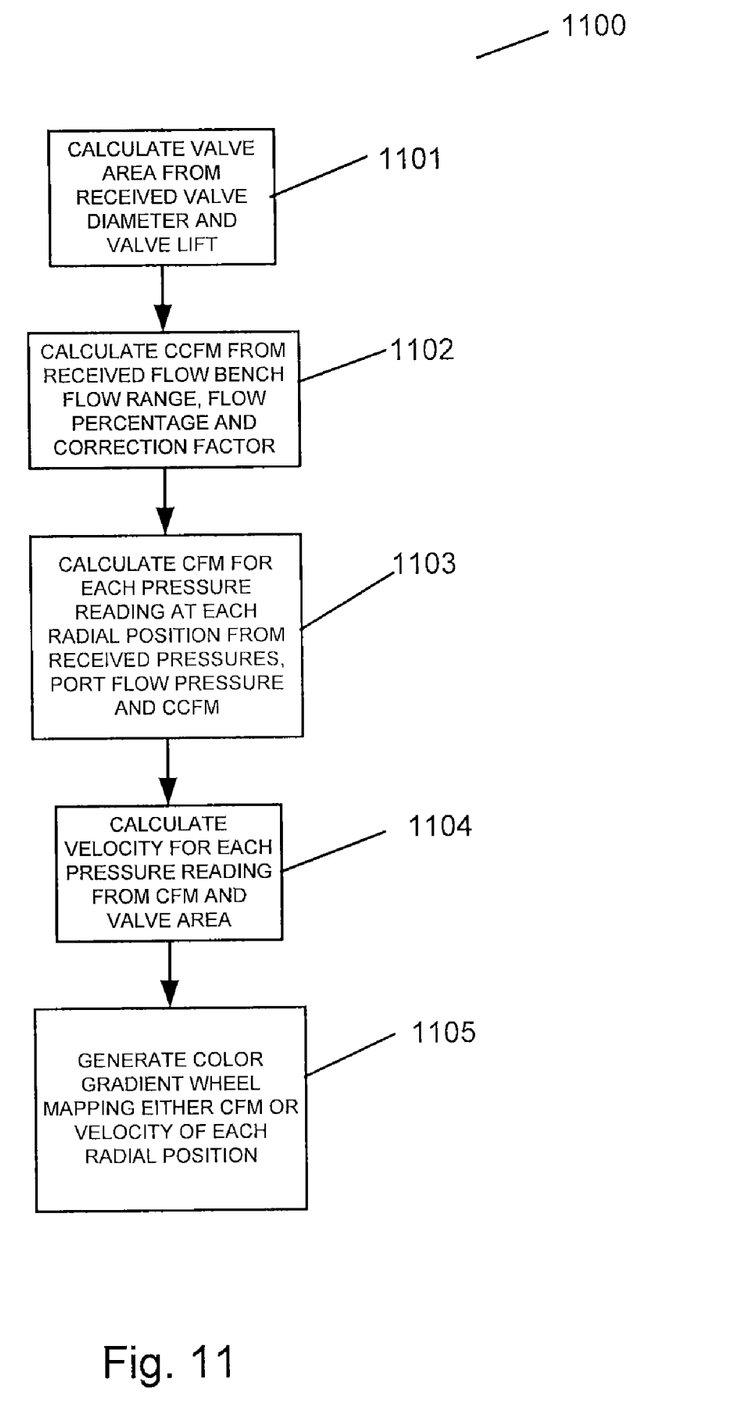
FIG. 11 is a flowchart of a process for processing and mapping pressure values from different radial positions.

FIG. 11 shows a flowchart of a process for processing and mapping pressure values from different radial positions. In the process 1100, a valve area may be calculated from a received valve diameter and valve lift. In block 1102, a corrected cubic feet per minute (CCFM) may be calculated from a received flow bench flow range, flow percentage, and correction factor. In block 1103, a cubic feet per minute (CFM) may be calculated for each pressure reading at each radial position from received pressures, port flow pressure and CCFM. At block 1104, a velocity may be calculated for each pressure reading from a CFM value and the valve area. In block 1105, a color gradient wheel may be generated mapping either CFM or velocity of each radial position. The values may be mapped based on their radial position or may be mapped based on their magnitudes.

According to embodiments of the present invention, the valve may be rotated to various radial positions accurately, consistently and repeatedly. A pressure differential valve test apparatus according to embodiments of the present invention produce unobstructed pressure differential readings of the area of flow of a cylinder head port. These readings are repeatable and, therefore, more accurate port mapping of the pressure differentials within the cylinder head port can be obtained. Further, according to embodiments of the present invention, test results may be used by an application or computer program that compiles and stores all the pressure values data from the test. The application may then graphically display the various pressure differentials allowing a user/test operator to quickly review the pressure reading data and identify concerns. The various pressure differentials may be displayed in color, gray shade, or some other differentiating matter to allow identification of problem areas. A user may then make changes to the cylinder head configuration or design and retest with accuracy, streamlining the research and development process. This allows cylinder head testing having quality accurate information not typically compiled in the past.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A pressure differential valve apparatus comprising:
    a valve, the valve including a valve stem having a first end and a second end and a valve head connected to the first end of the valve stem, the valve head and valve stem having a central longitudinal axis therethough, the valve head having a valve face with an opening spaced from the longitudinal axis that continues inside an interior of the valve head to an intersection with the valve stem and along a length of the valve stem to the second end of the valve stem,
    wherein the valve face opening rotates about the longitudinal axis when the valve stem is rotated about the longitudinal axis, and
    wherein the apparatus is adapted to allow pressure readings when the valve is rotated within an area of flow of a cylinder head.

2. The apparatus according to claim 1, further comprising a collar, the collar having an opening through the center along a length of the collar for passage of the valve stem, the collar configured to allow the valve stem to rotate about the longitudinal axis.

3. The apparatus according to claim 1, wherein the pressure readings allow differential mapping of the area of flow within the cylinder head port.

4. The apparatus according to claim 1, further comprising the valve stem having equally spaced splines along a length of the valve stem configured to allow rotation and positioning of the valve stem and valve face.

5. The apparatus according to claim 4, wherein the collar further comprises a spring-loaded device configured to insert into the splines for rotation and positioning of the valve stem and valve face.

6. The apparatus according to claim 5, wherein the spring-loaded device comprises a detent ball in contact with the splines for positioning and rotating the valve stem.

7. The apparatus according to claim 1, further comprising the valve stem being configured for connection of the opening at the second end of the valve stem to a pressure gage for obtaining pressure readings.

8. The apparatus according to claim 1, further comprising a stop collar, the stop collar being attached to the valve stem, the stop collar configured to move the valve face relative to a port opening of the cylinder head to provide a valve lift from the cylinder head and to rotate the valve.

9. The apparatus according to claim 1, wherein specifications of the apparatus are customized to a geometric design of the cylinder head.

10. The apparatus according to claim 9, wherein the specifications comprise at least one of the length of the valve stem and a diameter of the valve face.

11. The apparatus according to claim 1, wherein the valve head is substantially perpendicular to the valve stem.

12. The apparatus according to claim 1, wherein the pressure readings are unobstructed.

13. The apparatus according to claim 1, wherein the valve face is a substantially circular ring.

14. A method for generating a radial pressure differential mapping for a cylinder head port comprising:
    positioning a valve head of a valve in a cylinder head port, the valve head having a valve face with an opening;
    reading a pressure value at the opening located in an initial radial direction;
    rotating the valve such that the opening is in a different radial direction;
    reading a second pressure value at the opening in the different radial direction;
    repeating the rotating and reading multiple pressure values at the opening in different radial directions to get a set of radial pressure values; and
    mapping the set of radial pressure values according to their associated radial direction.

15. The method according to claim 14, wherein the mapping further comprises:
    receiving a valve diameter and a lift value;
    calculating a valve area;
    providing an option for entering at least one of a machine baseline percentage or a machine correction factor;
    providing an option for entering at least one of a port flow pressure, a port flow percentage or a port flow range;
    calculating a corrected cubic feet per minute (CCFM) based on at least one of the port flow percentage, the port flow range or the machine correction factor;
    calculating a cubic feet per minute (CFM) for each pressure value in the set of radial pressure values based on the set of radial pressure values, the port flow pressure and the CCFM;
    calculating a velocity for each pressure value based on the CFM for each pressure value and the valve area; and
    generating a color graphic displaying the calculated velocities, each velocity being displayed with an associated valve face direction and an associated color based on a value of each velocity for each pressure value relative to values of other velocities for each pressure value.

16. The method according to claim 15, wherein the color graphic comprises a color pressure gradient wheel.

17. The method according to claim 15, wherein the color graphic comprises a color bar chart.

18. The method according to claim 15, further comprising generating a color graphic displaying the calculated CFM values, each CFM value being displayed with an associated valve direction and an associated color based on each CFM value relative to other CFM values.

19. A non-obstructing pressure differential valve test apparatus comprising:
   a valve, the valve including a valve stem having a first end and a second end and a valve head connected to the first end of the valve stem, the valve head and valve stem having a central longitudinal axis therethough, the valve head having a valve face with an opening spaced from the longitudinal axis that continues inside an interior of the valve head to an intersection with the valve stem and along a length of the valve stem to the second end of the valve stem;
   a stop collar, the stop collar having an opening therethrough for passage of the valve stem, the stop collar connected to the valve and configured to rotate the valve face; and
   a workstation, the workstation being configured to:
      receive a valve diameter and a lift value;
      calculate a valve area;
      provide an option for entering at least one of a machine baseline percentage or a machine correction factor;
      provide an option for entering at least one of a port flow pressure, a port flow percentage or a port flow range;
      calculate a corrected cubic feet per minute (CCFM) based on at least one of the port flow percentage, the port flow range or the machine correction factor;
      calculate a cubic feet per minute (CFM) for each pressure value in a set of radial pressure values based on the set of radial pressure values, the port flow pressure and the CCFM;
      calculate a velocity for each pressure value based on the CFM for each pressure value and the valve area; and
      generate a color graphic displaying the calculated velocities, each velocity being displayed with an associated valve face direction and an associated color based on a value of each velocity for each pressure value relative to values of other velocities for each pressure value,
   wherein the apparatus is adapted to allow pressure readings at a plurality of rotational positions of the valve face within an area of flow of a cylinder head.

20. A pressure measurement apparatus for testing a cylinder head of an engine, the apparatus comprising:
   an elongated hollow member defining a first passage therethrough and having a first end and a second end, wherein a central longitudinal axis extends through the first passage; and
   a structural element defining a second passage therethrough ending at first and second openings in the structural element, the structural element being mounted to the first end of the elongated hollow member such that the second passage at the first opening is in fluid communication with the first passage,
wherein the second opening in the structural element is laterally spaced from the central longitudinal axis,
wherein when the elongated hollow member is rotated about the central longitudinal axis, the second opening in the structural element rotates about the central longitudinal axis, allowing pressure measurements to be taken at a plurality of locations around the central longitudinal axis.

* * * * *